(12) United States Patent
Vipula

(10) Patent No.: US 11,780,587 B2
(45) Date of Patent: Oct. 10, 2023

(54) FOOD TRAY FOR PASSENGER SEAT

(71) Applicant: HAECO Americas, LLC, Greensboro, NC (US)

(72) Inventor: Dasanayaka Vipula, Greensboro, NC (US)

(73) Assignee: HAECO Cabin Solutions, LLC, Greensboro, NC (US)

( * ) Notice: Subject to any disclaimer, the term of this patent is extended or adjusted under 35 U.S.C. 154(b) by 365 days.

(21) Appl. No.: 16/967,348

(22) PCT Filed: Jan. 29, 2019

(86) PCT No.: PCT/US2019/015588
§ 371 (c)(1),
(2) Date: Aug. 4, 2020

(87) PCT Pub. No.: WO2019/156846
PCT Pub. Date: Aug. 15, 2019

(65) Prior Publication Data
US 2021/0039793 A1    Feb. 11, 2021

Related U.S. Application Data

(60) Provisional application No. 62/628,225, filed on Feb. 8, 2018.

(51) Int. Cl.
*B64D 11/06* (2006.01)
*B64D 11/00* (2006.01)
(Continued)

(52) U.S. Cl.
CPC .... *B64D 11/0638* (2014.12); *B64D 11/00151* (2014.12); *B64D 11/00155* (2014.12);
(Continued)

(58) Field of Classification Search
CPC .......... B64D 11/0638; B64D 11/00151; B64D 11/00155; B64D 11/0642; B64D 11/0647; D07B 1/163; F16G 9/00
See application file for complete search history.

(56) References Cited

U.S. PATENT DOCUMENTS 3,722,964 A    3/1973  Chitester et al.
3,762,766 A  * 10/1973  Barecki ........................ 297/331
(Continued)

FOREIGN PATENT DOCUMENTS

WO    WO 2007/013741    2/2007

OTHER PUBLICATIONS

European Search Report for European Application No. 19751345.0 dated Sep. 21, 2021.

*Primary Examiner* — Anthony D Barfield
(74) *Attorney, Agent, or Firm* — MacCord Mason PLLC

(57) ABSTRACT

A seating assembly for a passenger aircraft. The seat system may include at least one passenger seat and a seat back tray assembly mounted onto the back of the passenger seat and movable between a first storage position and a second deployed position. The tray assembly may include (i) a tray having a first and second attachment arm mounted onto the tray for installing the tray onto the back of a seat system; (ii) a sliding mechanism installed on the first and second attachment arms adapted for providing movement between a first forward position and a second aft position to a seated passenger parallel to the first and second attachment arms; and (iii) an alignment mechanism attached to the sliding mechanism for maintaining the tray in a horizontally aligned relationship during the movement. The seat system may further include a PED holder adapted to hold a personal electronic device.

55 Claims, 16 Drawing Sheets

(51) Int. Cl.
*D07B 1/16* (2006.01)
*F16G 9/00* (2006.01)

(52) U.S. Cl.
CPC ...... *B64D 11/0642* (2014.12); *B64D 11/0647* (2014.12); *D07B 1/162* (2013.01); *F16G 9/00* (2013.01); *D07B 2201/2092* (2013.01); *D07B 2205/2003* (2013.01); *D07B 2205/205* (2013.01); *D07B 2501/2084* (2013.01)

(56) References Cited

U.S. PATENT DOCUMENTS

| | | | |
|---|---|---|---|
| 3,773,381 | A | 11/1973 | Brennan |
| 5,395,165 | A | 3/1995 | Woerner |
| 5,464,083 | A | 11/1995 | Arnold et al. |
| 8,667,904 | B2 | 3/2014 | Pajic |
| 9,067,682 | B2 | 6/2015 | Pajic |
| 9,168,876 | B2 | 10/2015 | Pajic |
| 9,403,596 | B2 | 8/2016 | Pajic |
| 9,409,647 | B2 | 8/2016 | Pajic |
| 2003/0106469 | A1* | 6/2003 | Jensen ........................... 108/44 |
| 2010/0326331 | A1 | 12/2010 | St. Louis |
| 2013/0147240 | A1 | 6/2013 | Lee |
| 2014/0077533 | A1 | 3/2014 | Shih et al. |
| 2014/0191005 | A1 | 7/2014 | Pajic |
| 2014/0241650 | A1 | 8/2014 | Khankal et al. |
| 2015/0061327 | A1 | 3/2015 | Millan |
| 2015/0291073 | A1 | 10/2015 | Pajic |
| 2016/0023618 | A1 | 1/2016 | Pajic |
| 2016/0023766 | A1 | 1/2016 | Pajic |
| 2016/0039525 | A1 | 2/2016 | Pajic |
| 2016/0114891 | A1 | 4/2016 | Pajic |
| 2016/0128475 | A1 | 5/2016 | Jahrling et al. |
| 2017/0283067 | A1 | 10/2017 | Darbyshire et al. |

* cited by examiner

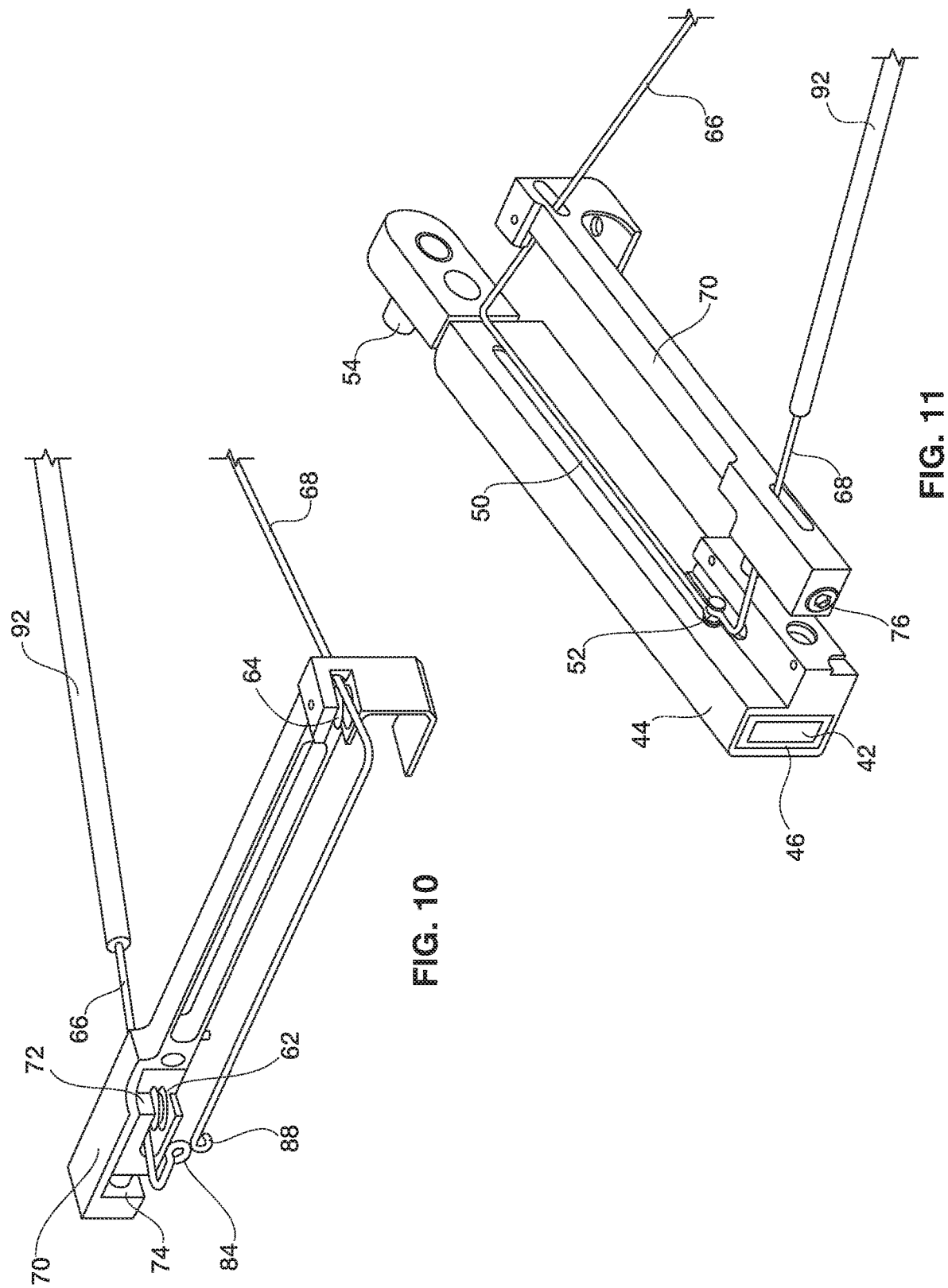

FOOD TRAY FOR PASSENGER SEAT

BACKGROUND OF THE INVENTIONS

(1) Field

The present inventions relates generally to seating assemblies for passenger vehicles and, more particularly, to a seating assembly for a passenger aircraft.

(2) Related Art

Many passenger seats on vehicles such as aircrafts include a tray table installed onto the back of the seats to provide a surface for a passenger to eat, play or work. These tray tables are typically stowed vertically and are opened by pivoting the tray to a horizontal position. Oftentimes, the tray tables are adapted to slide further forward to place the tray table closer to the passenger, if desired. One of the main drawbacks to employing a sliding mechanism with a tray table is the tendency for the tray table to jam when the passenger slides the tray, particularly when the passenger slides the tray and exerts an unequal amount of force on a single side of the tray.

Thus, there remains a need for a new and improved seat system for a passenger aircraft having a seat back tray assembly with a sliding mechanism enabling the tray to slide in a forward-and-aft direction, while, at the same time, is adapted to maintain a horizontal relationship while sliding in a desired direction.

SUMMARY OF THE INVENTIONS

The present inventions are directed to a seat system for a passenger aircraft. The seat system includes at least one passenger seat and a seat back tray assembly mounted onto the back of the passenger seat and movable between a first storage position and a second deployed position. The tray assembly includes (i) a tray having a first and second attachment arm mounted onto the tray for installing the tray onto the back of a seat system; (ii) a sliding mechanism installed on the first and second attachment arms adapted for providing movement between a first forward position and a second aft position to a seated passenger parallel to the first and second attachment arms; and (iii) an alignment mechanism attached to the sliding mechanism for maintaining the tray in a horizontally aligned relationship during the movement. The seat system may further include a PED holder adapted to hold a personal electronic device.

In one embodiment, the sliding mechanism comprises a rail and guide assembly. The rail and guide assembly may include a first pin attached to one side of the tray and a second pin attached to an opposing side of the tray, and a first slot and a second slot adjacent to each side of the tray with each pin inserted within each slot, whereby the tray slides by sliding the pins along the slots.

In one embodiment, the alignment mechanism includes a pulley assembly having: (a) a first cable and a second cable; (b) a first pair of pulleys with one pulley mounted adjacent to the front end and another pulley mounted adjacent to the rear end of the first slot of the rail and guide assembly, and a second pair of pulleys with one pulley mounted adjacent to the front end and another pulley mounted adjacent to the rear end of the second slot of the rail and guide assembly; (c) a first end of the first cable connected to the first pin and the first cable extending rearwardly therefrom over the pulley at the rear end of the first slot, laterally across and over the pulley at the front end of the second slot and connected to the second pin at an opposing end of the first cable; (d) a first end of the second cable connected to the first pin and the second cable extending forwardly therefrom over the pulley at the front end of the first slot, laterally across and rearwardly over the pulley at the rear end of the second slot and connected to the second pin at an opposing end of the second cable; whereby the first and second cables are movable with the first and second pins during sliding movement in the forward-and-aft directions and maintain the horizontal alignment of the first and second pins regardless of a leftward or rightward force exerted on the tray.

The pulley assembly may include each pair of pulleys mounted within a pulley block assembly installed adjacent to each slot of the rail and guide assembly. In addition, the pulley block assembly may further includes a groove and a pulley slider with one of the pulleys mounted within, the pulley slider inserted inside the groove and adapted to slide within the groove to modify a tension of the cable attached to the pulley.

The pulley assembly may further include an adjustment screw inserted into a threaded aperture on the pulley slider and adapted to adjust the tension of the cable attached to the pulley by tightening or loosening the adjustment screw to slide the pulley slider in a forward-and-aft direction. In one embodiment, the adjustment screw is accessible on an exterior of the tray for adjusting the tension of the cable without disassembling the tray.

In one embodiment, the pin is a stop preventing the tray from further moving in a direction.

In one embodiment, the cables are concealed within channels inside of the tray. The cables may further include a sheathing to prevent the first and second cables from sliding on one another. In one embodiment, the sheathing is comprised of polytetrafluoroethylene.

In one embodiment, the cables are substantially inelastic. In one embodiment, the cables comprise para-aramid fibers. In one embodiment, the cables are of the same effective length.

In one embodiment, the alignment mechanism includes a pulley assembly having: (a) a cable; (b) a first set of pulleys with one pulley mounted adjacent to the front end and another pulley mounted adjacent to the rear end of the first slot of the rail and guide assembly, and a second set of pulleys with one pulley mounted adjacent to the front end and another pulley mounted adjacent to the rear end of the second slot of the rail and guide assembly; (c) a first end of the cable connected from the pulley at the front end of the first slot to the first pin and extending rearwardly therefrom to the pulley at the rear end of the first slot; (d) a second end of the cable connected from the pulley at the front end of the second slot to the second pin and extending rearwardly therefrom to the pulley at the rear end of the second slot, wherein the cable extends laterally across from the pulley at the rear end of the first slot to the pulley at the rear end of the second slot; whereby the cable is movable with the first and second pins during sliding movement in the forward-and-aft directions and maintain the horizontal alignment of the first and second pins regardless of a leftward or rightward force exerted on the tray.

Also, the pulley assembly may include each pair of pulleys mounted adjacent to each slot of the rail and guide assembly.

In one embodiment, the tray is a food tray. In one embodiment, the tray comprises a bi-fold food tray having a first portion and a second portion hingedly connected.

In one embodiment, the PED holder is attached onto the seat back tray assembly.

Also, the tray assembly may be a stowable clamshell holder installed on the back of the passenger seat.

The seat system may further include a lock mechanism attached to the back of the passenger seat for retaining the seat back tray assembly in a secured position.

The seat system may also further include a display attached to the back of the passenger seat. In one embodiment, the display is adjoined by a seat back bezel.

The passenger seat may also include a base frame, a seat component attached to the base frame and a backrest attached to the base frame adjoining the seat component. The passenger seat may further include a head rest. In one embodiment, the head rest is adjustable to accommodate for the height of the passenger.

The passenger seat may further include an upholstery package. Also, the passenger seat may further include a trim package.

Accordingly, one aspect of the present inventions is to provide a seat system for a passenger aircraft, the seat system including (a) at least one passenger seat; and (b) a seat back tray assembly mounted onto the back of the passenger seat and movable between a first storage position and a second deployed position, the food tray assembly including (1) a tray having a sliding mechanism adapted for providing movement between a first forward position and a second aft position to a seated passenger and (2) an alignment mechanism attached to the sliding mechanism for maintaining the tray in a horizontally aligned relationship during the movement.

Another aspect of the present inventions is to provide a seat back tray assembly adapted to be mounted onto the back of a passenger seat for a passenger aircraft and movable between a first storage position and a second deployed position, the seat back tray assembly including (a) a tray having a first and second attachment arm mounted onto the tray for installing the tray onto the back of a seat system; (b) a sliding mechanism installed on the first and second attachment arms adapted for providing movement between a first forward position and a second aft position to a seated passenger parallel to the first and second attachment arms; and (c) an alignment mechanism attached to the sliding mechanism for maintaining the tray in a horizontally aligned relationship during the movement.

Still another aspect of the present inventions is to provide a seat system for a passenger aircraft, the seat system including (a) at least one passenger seat; (b) a seat back tray assembly mounted onto the back of the passenger seat and movable between a first storage position and a second deployed position, the tray assembly including (i) a tray having a first and second attachment arm mounted onto the tray for installing the tray onto the back of a seat system; (ii) a sliding mechanism installed on the first and second attachment arms adapted for providing movement between a first forward position and a second aft position to a seated passenger parallel to the first and second attachment arms; and (iii) an alignment mechanism attached to the sliding mechanism for maintaining the tray in a horizontally aligned relationship during the movement; and (c) a PED holder adapted to hold a personal electronic device.

These and other aspects of the present inventions will become apparent to those skilled in the art after a reading of the following description of embodiments when considered with the drawings.

BRIEF DESCRIPTION OF THE DRAWINGS

FIG. 10 is an enlarged side perspective view of the pulley assembly shown in FIG. 9;

FIG. 11 is an enlarged side perspective view of a rail and guide assembly and a pulley assembly with a pulley block assembly partially disassembled;

DESCRIPTION OF THE EMBODIMENTS

Figure 1:
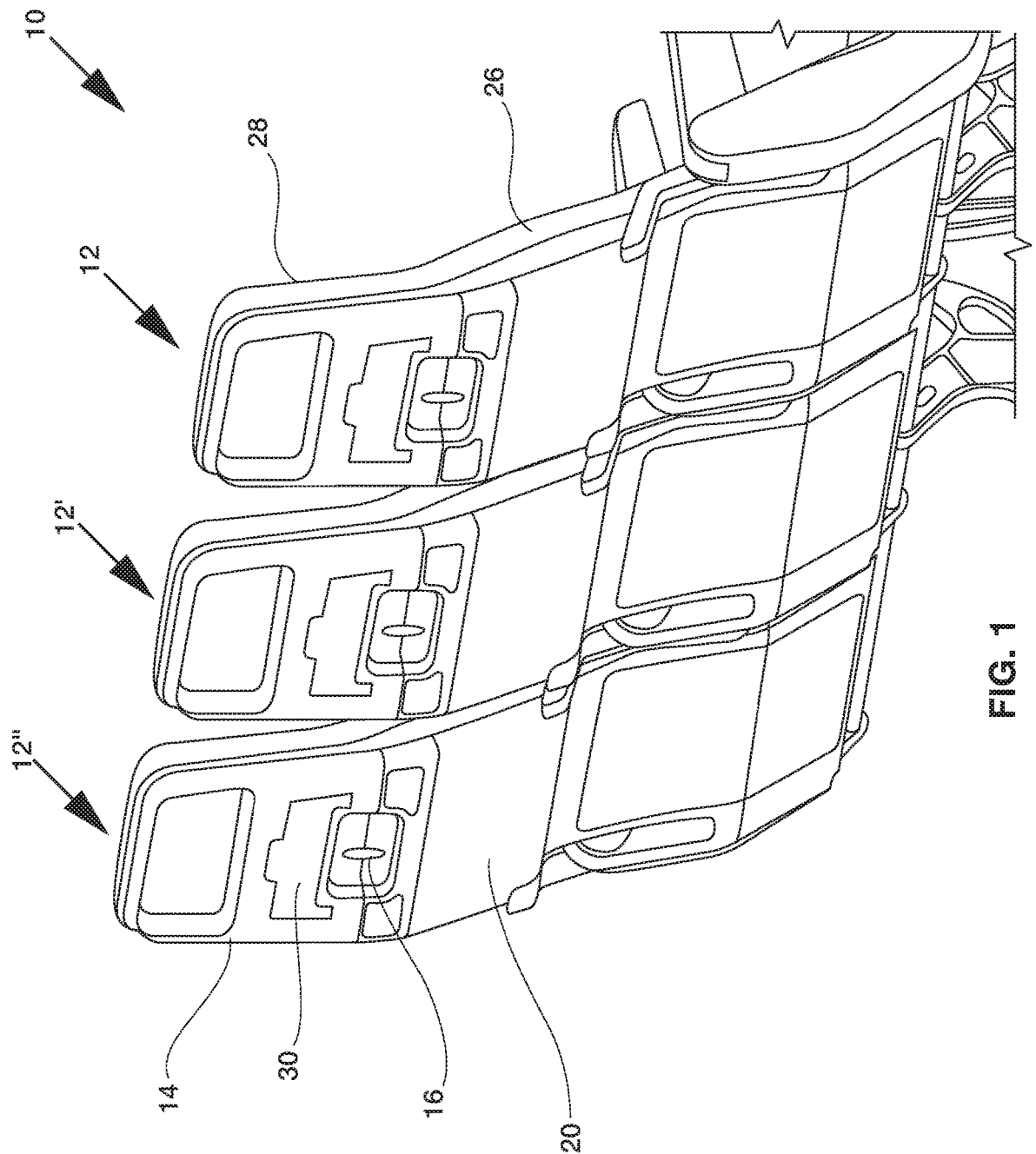
FIG. 1 is a rear perspective view of one embodiment of a seating assembly constructed according to the present inventions.

In the following description, like reference characters designate like or corresponding parts throughout the several views. Also in the following description, it is to be understood that such terms as "forward," "rearward," "left," "right," "upwardly," "downwardly," and the like are words of convenience and are not to be construed as limiting terms.

Referring now to the drawings in general and FIG. 1 in particular, it will be understood that the illustrations are for the purpose of describing a preferred embodiment of the inventions and are not intended to limit the inventions thereto. As best seen in FIG. 1, a seat system, generally designated 10, is shown constructed according to the present inventions. The seat system 10 includes at least one passenger seat 12.

Each of the passenger seats 12 may include a base frame 22, a seat component 24 attached to a base frame and a backrest 26 attached to the base frame 22 adjoining the seat component 24. The backrest 26 may further include a headrest 28. In one embodiment, headrest 28 is adjustable to accommodate the height of a passenger.

Figure 2:
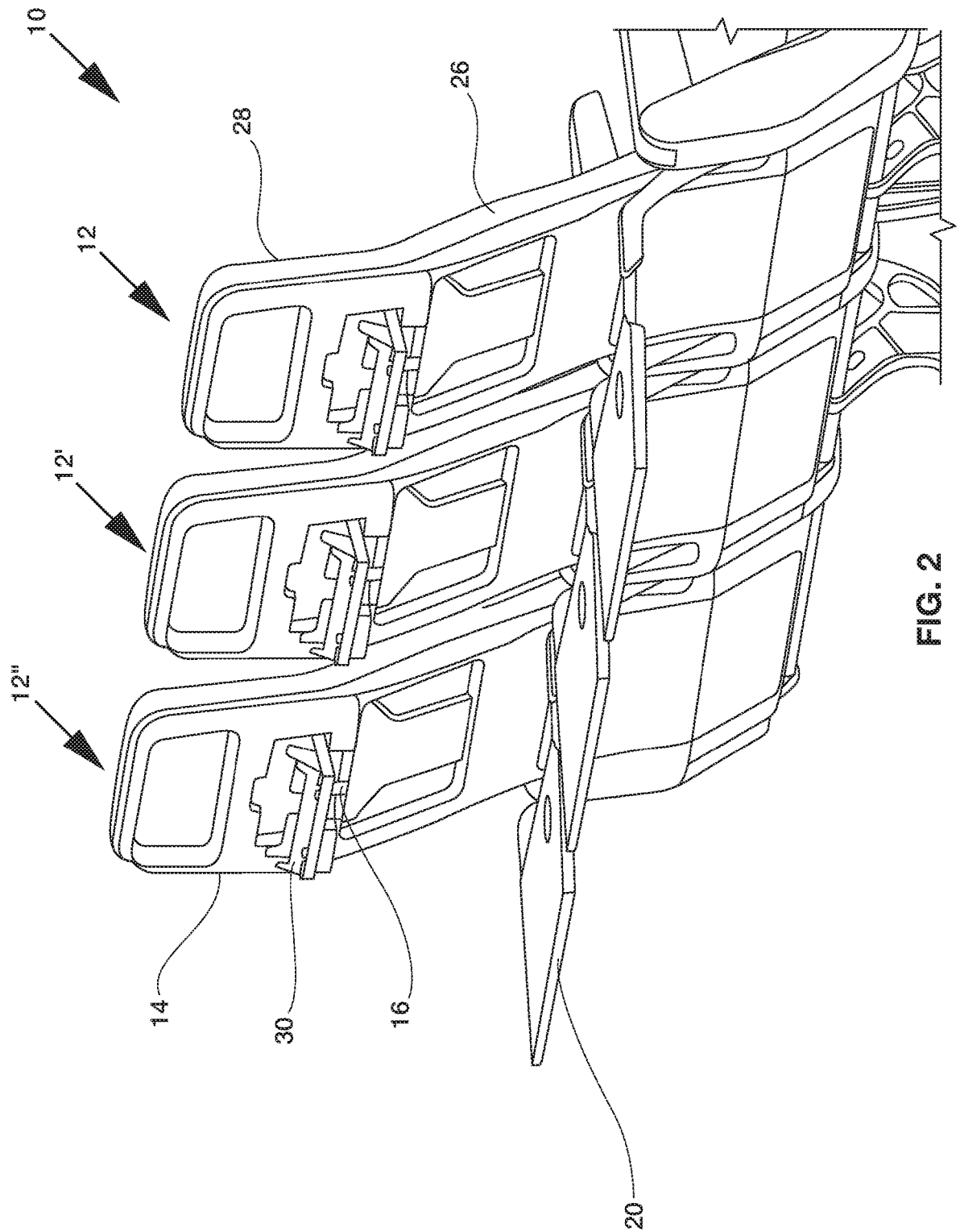
FIG. 2 is a rear perspective view of the embodiment in FIG. 1 with the tray table and stowable clamshell holder for a personal electronic device (PED) in open configurations.

Turning to FIG. 2, there is shown a rear view of the seat system 10 constructed according to the present inventions. A seat back bezel 14 is attached to the back of the passenger seat 12. The seat back bezel 14 may adjoin a seat back tray assembly 20 attached to the back of passenger seat 12. The seat back tray assembly 20 attached to the back of the passenger seat 12 is movable between its first storage position and a second deployed position. A lock mechanism 16 attached to the back of the seat back bezel 14 is adapted to retain the seat back tray assembly 20 in its secured position. The passenger seat 12 may further include an upholstery package and may include a trim package. The passenger seat 12 may further include a shroud or bezel mounted onto its back. A stowable clamshell holder 30 adapted to hold a personal electronic device ("PED holder") may also be installed into seat back bezel 14.

Figure 3:
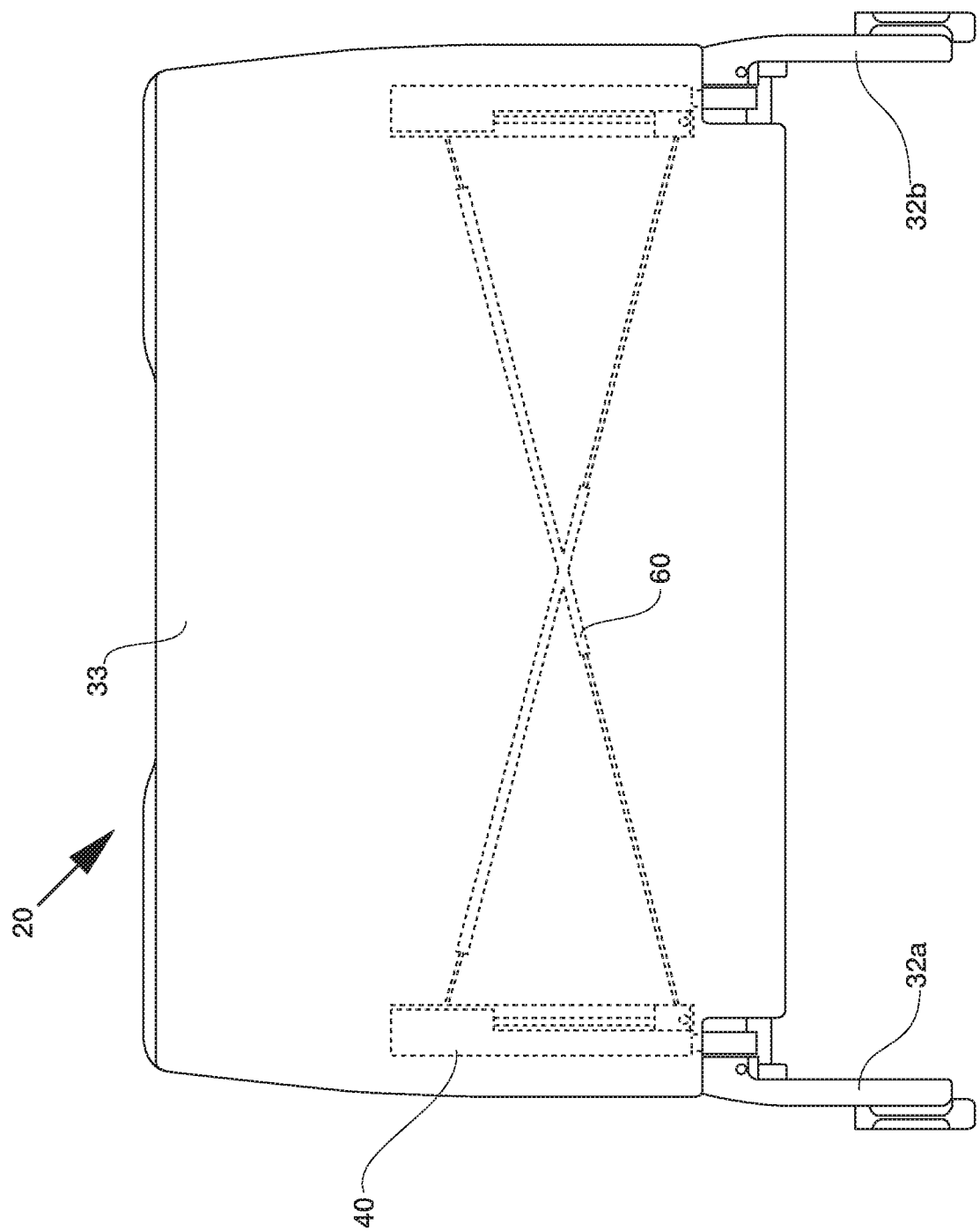
FIG. 3 is an enlarged top view of one embodiment of a seat back food tray assembly having an alignment mechanism constructed according to the present inventions.

FIG. 3 depicts one embodiment of a seat back tray assembly 20 mounted onto the seat 12 with mounting arms 32a and 32b. The seat back tray assembly 20 includes a sliding mechanism 40 to slide the tray assembly 20 in a forward or aft direction, and further includes an alignment mechanism 60 to prevent the tray assembly 20 from jamming when a passenger slides the tray assembly 20 in a forward or aft direction. The alignment mechanism 60 operates by equalizing the force exerted on both sides of the tray 33 during movement to maintain the tray in a horizontally aligned relationship.

Figure 4:
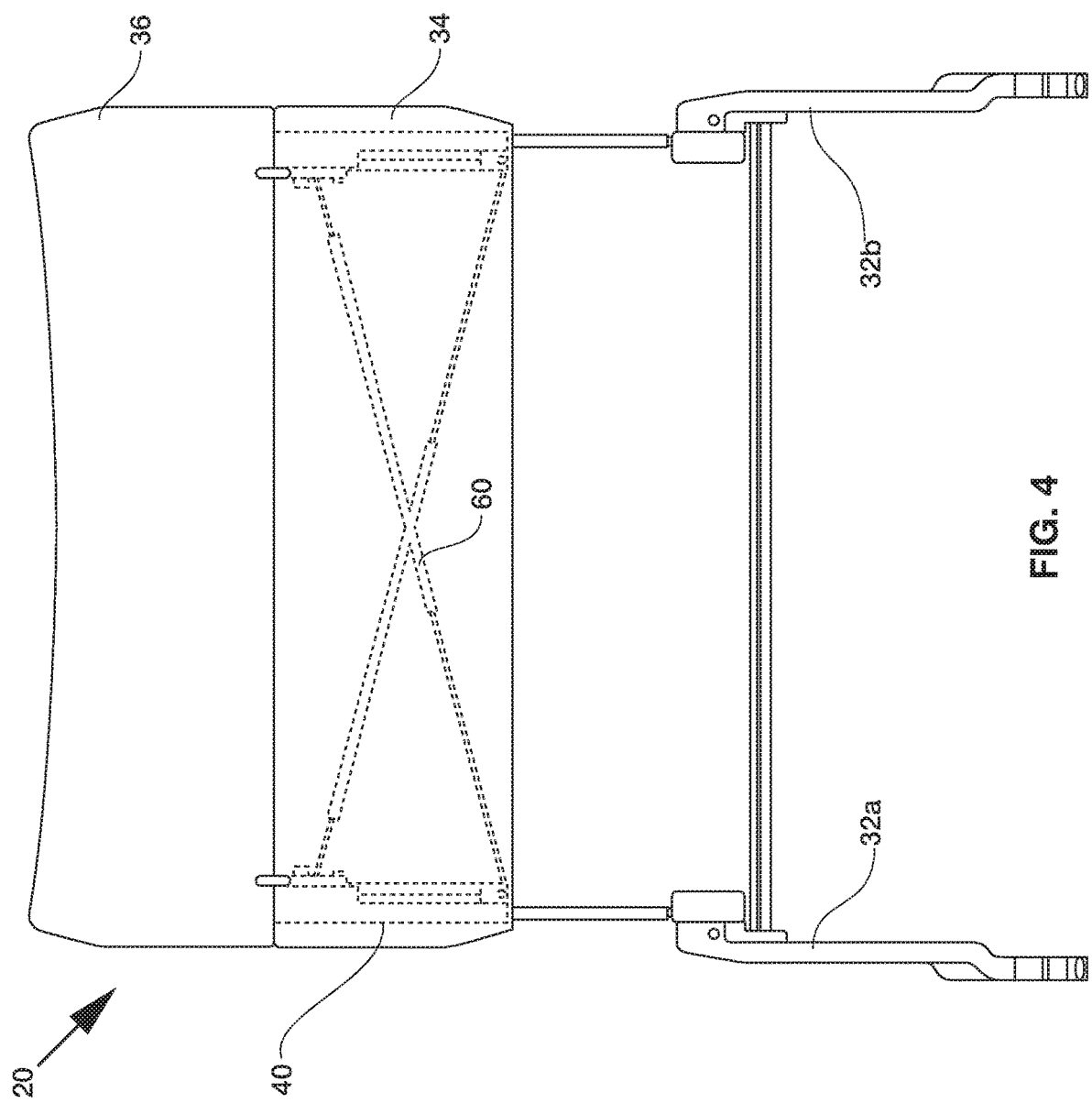
FIG. 4 is an enlarged top view of one embodiment of a bi-fold food tray assembly having an alignment mechanism constructed according to the present inventions.

FIG. 4 depicts another embodiment of a seat back tray assembly 20 comprising a bi-fold food tray mounted onto the seat 12 with mounting arms 32a and 32b. The seat back tray assembly 20 includes a sliding mechanism 40 to slide the tray assembly 20 in a forward or aft direction, and further includes an alignment mechanism 60 to prevent the tray assembly 20 from jamming when a passenger slides the tray assembly 20 in a forward or aft direction. The alignment mechanism 60 operates by equalizing the force exerted on both sides of the tray during movement to maintain the tray in a horizontally aligned relationship.

Figure 6:
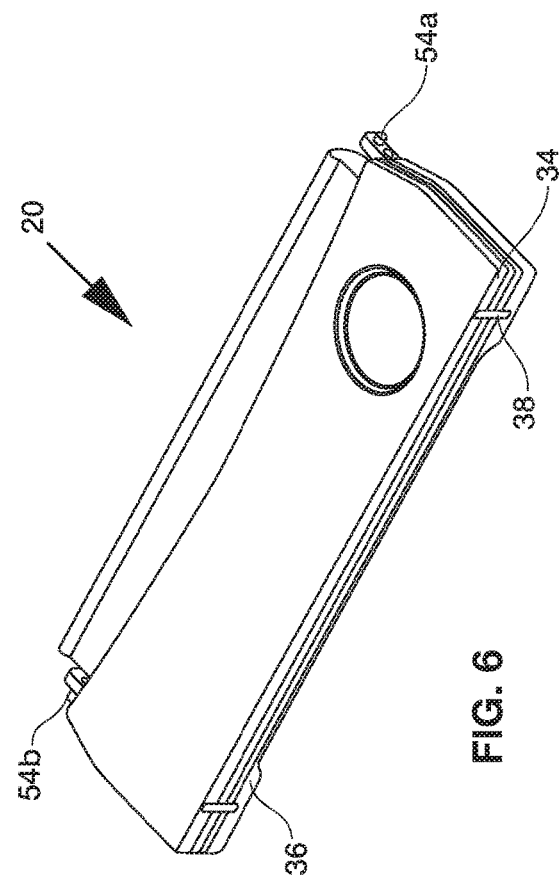
FIG. 6 is an enlarged top perspective view of the bi-fold food tray assembly shown in FIG. 5 in a closed configuration.
Figure 5:
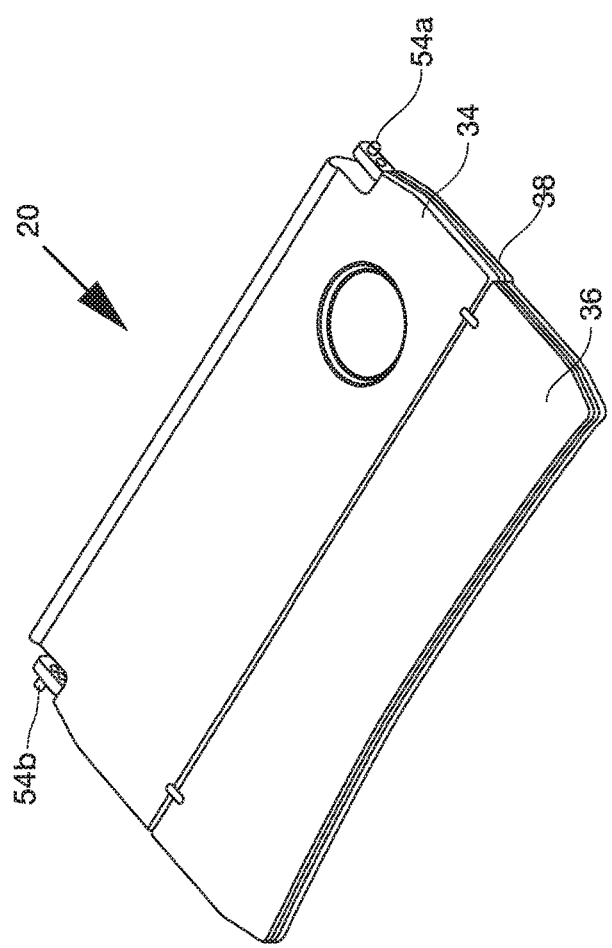
FIG. 5 is an enlarged top perspective view of a bi-fold food tray assembly in an open configuration.

As seen in FIGS. 5 and 6, the bi-fold food tray comprises a first portion 34 and a second portion 36 that are connected via hinge 38. While deployed, the first portion 34 and second portion 36 form a uniform surface for a passenger to use as a food tray (FIG. 5). FIG. 6 shows that the second portion 36 may be folded to overlap first portion 34 when the bi-fold tray is to be positioned in a stowed position, or used as a smaller tray (i.e., partial tray).

Figure 7:
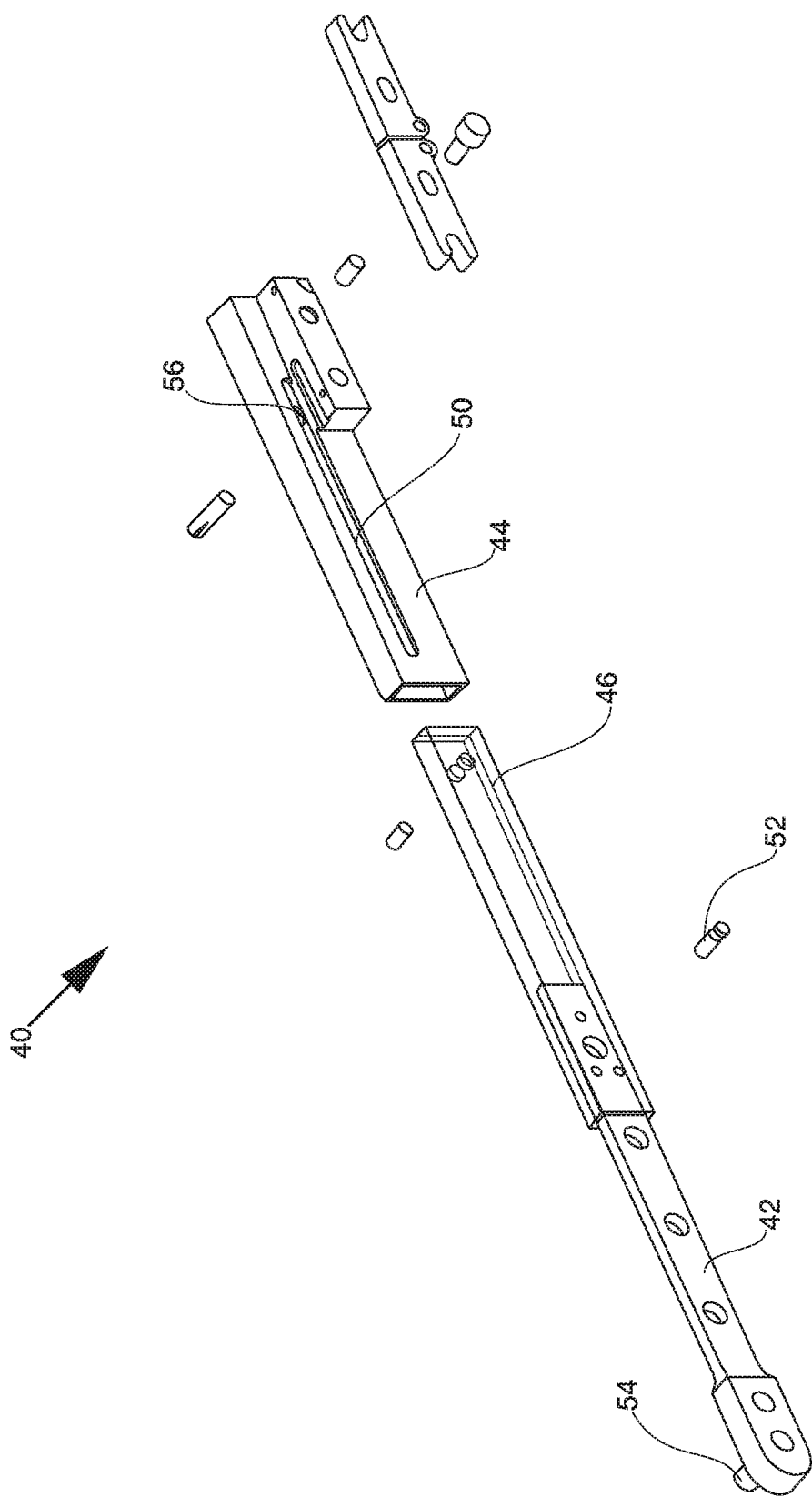
FIG. 7 is an exploded side perspective view of a rail and guide assembly according to one embodiment.

One embodiment of a sliding mechanism adapted for use with the seat back tray assembly 20 is shown in FIG. 7. A rail and guide assembly 40 may be employed as a sliding mechanism to slide the tray assembly 20 in the forward and aft directions. In the embodiment shown, the rail and guide assembly 40 comprises a rail assembly 42 inserted into a rail guide 44. A sleeve 46 may be added over the rail assembly 42 to facilitate operation of the rail and guide assembly 40. The rail guide 44 includes a slot 50 adapted for a pin 52 installed on the rail assembly 42 (inserted through aperture 56) to slide within. The pin 52 may act as a stop preventing further movement of the tray when the pin 52 reaches either end of the slot 50. The rail assembly 42 may also include a pin 54 for attaching the tray to a mounting arm 32.

Figure 8:
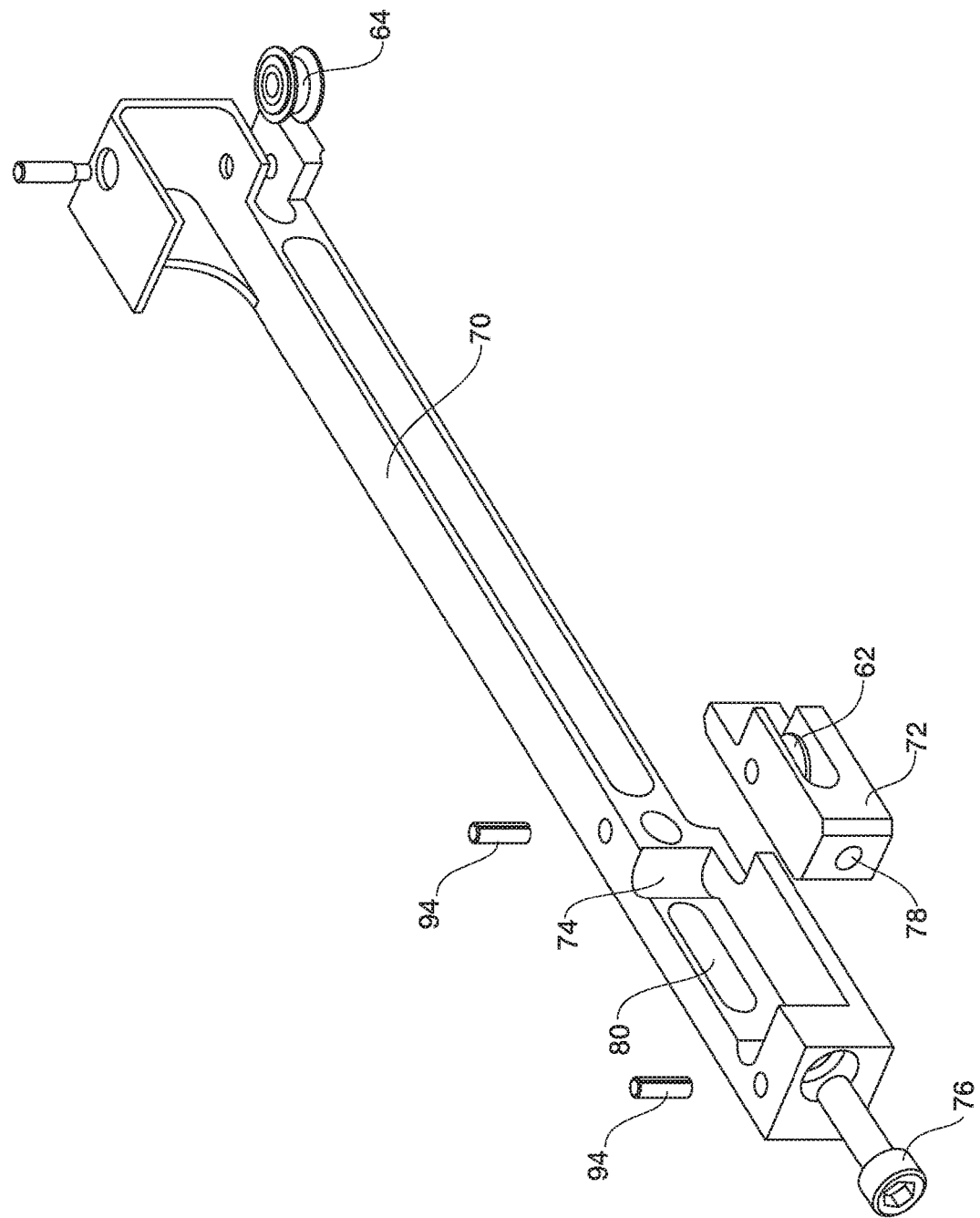
FIG. 8 is an exploded side perspective view of a pulley block assembly according to one embodiment.

FIG. 8 depicts one embodiment of an alignment mechanism 60 for use with the seat back tray assembly 20. The alignment mechanism 60 shown comprises a series of pulleys 62 and 64 that may be installed on or adjacent to the sliding mechanism, wherein the pulleys are connected to one or more cables to equalize the force applied on each side of the tray. As seen in FIG. 8, one embodiment of the pulley assembly may comprise a series of pulleys installed onto a pulley block assembly 70 adapted to be installed adjacent to the rail and guide assembly 40. A pair of pulleys 62 and 64 are mounted at the front and rear ends of slot 50, respectively. The pulley block assembly 70 also includes apertures 80 for a cable to pass through the pulley block assembly. In the embodiment shown in FIG. 8, the pulley 62 is mounted within a pulley slider assembly 72. The pulley slider assembly 72 is adapted to adjust the tension of a cable attached to the pulley 62 by sliding within a groove 74 on the pulley block assembly 70 adapted for receiving the pulley slider assembly. Tension is adjusted by turning an adjustment screw 76 that is received by aperture 78 on the pulley slider assembly 72. In this embodiment, sliding the pulley slider assembly 72 toward pulley 64 decreases the tension of a cable attached to pulley 62, and conversely, sliding the pulley slider assembly 72 away from pulley 64 increases the tension of a cable attached to pulley 62.

Figure 9:
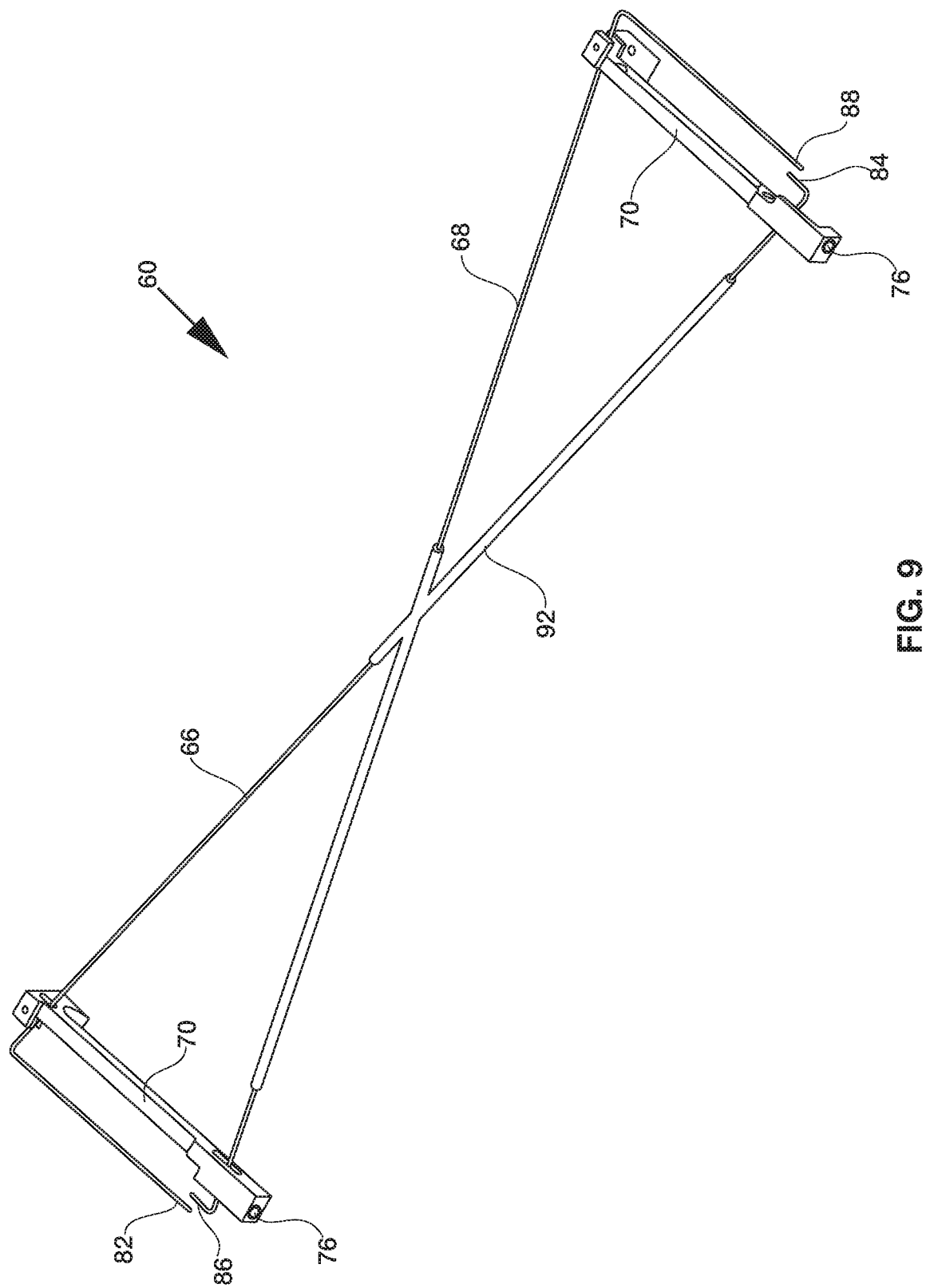
FIG. 9 is an overhead perspective view of a pulley assembly partially assembled.

One embodiment of the pulley assembly 60 is shown in FIGS. 9 and 10, wherein the pulley assembly 60 includes a first cable 66 and a second cable 68 connected to a first and second pair of pulleys adapted to be installed on a tray adjacent to the rail guide assembly 40. Preferably, the cables are comprised of a substantially inelastic material to maintain constant tension that is durable and lightweight. In one embodiment, the cables are comprised of KEVLAR®-brand para-aramid fibers. A sheathing 92 may also be included to prevent the cables from sliding onto one another. For example, the sheathing may be comprised of TEFLON®-brand polytetrafluoroethylene.

FIG. 10 shows the first cable 66 and second cable 68 connected to a front pulley 62 and a rear pulley 64, respectively, on a pulley block assembly 70. As seen in FIG. 11, one end 82 of the first cable 66 is adapted to be connected to a pin 52, and extends rearwardly therefrom over the pulley 64 laterally across a tray and over the pulley 62 located on a front end of a second pulley block assembly 70. The first cable 66 extends for an opposing end 84 to connect to a pin 52 installed on a second rail and guide assembly, as seen in FIG. 10. Similarly, one end 86 of the second cable 68 is adapted to be connected to a pin 52 on a first rail and guide assembly, and extends forwardly over the pulley 62 at the front end and laterally across a tray to over the pulley 64 at a rear end of a second pulley block assembly 70. The second cable 68 continues to extend forward wherein an opposing end 88 is connected to a second pin 52.

Figure 12:
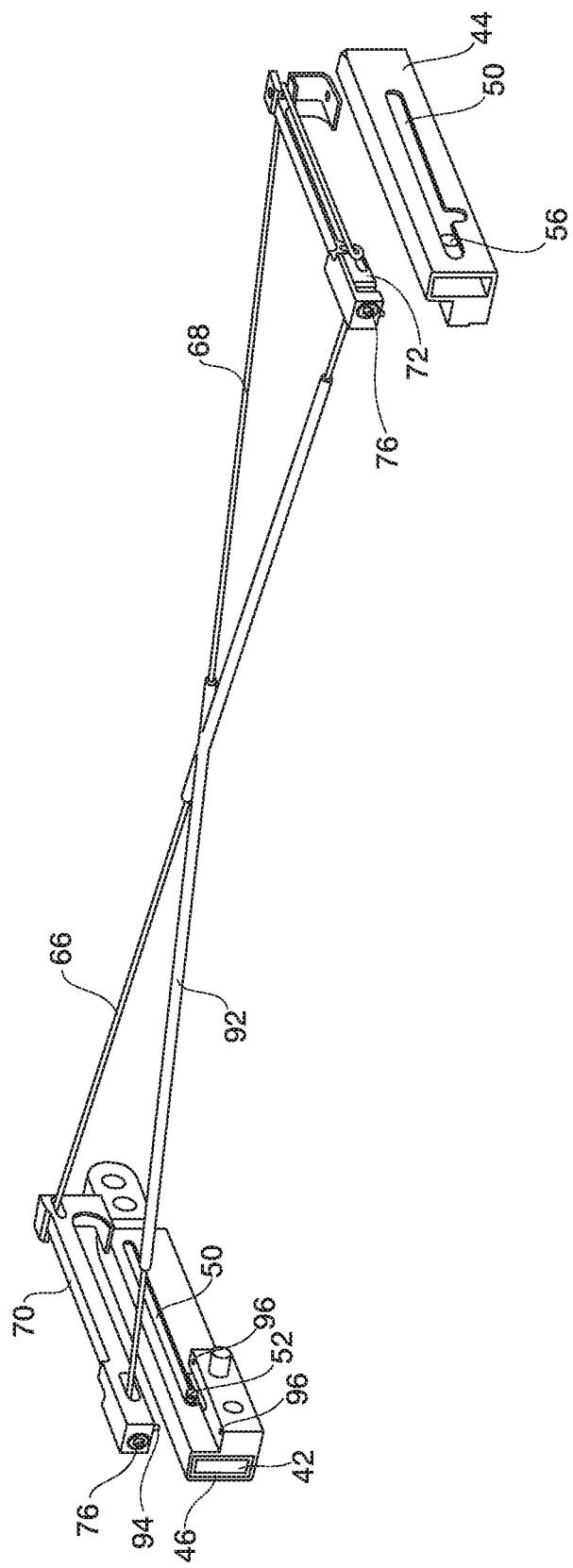
FIG. 12 is a front perspective view of a rail and guide assembly with the alignment mechanism disassembled.
Figure 13:
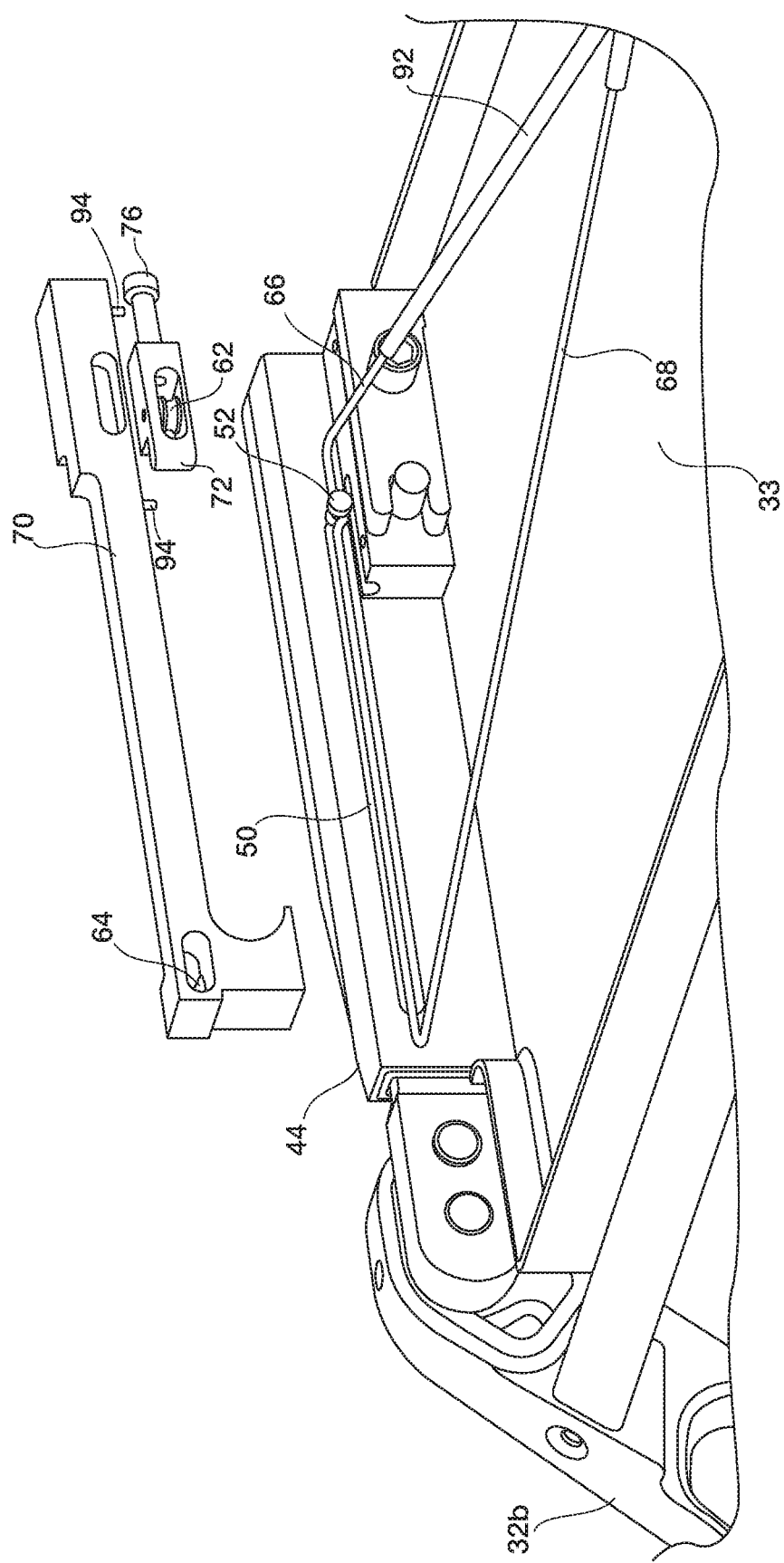
FIG. 13 is an enlarged rear perspective view of a seat back food tray assembly partially disassembled.
Figure 14:
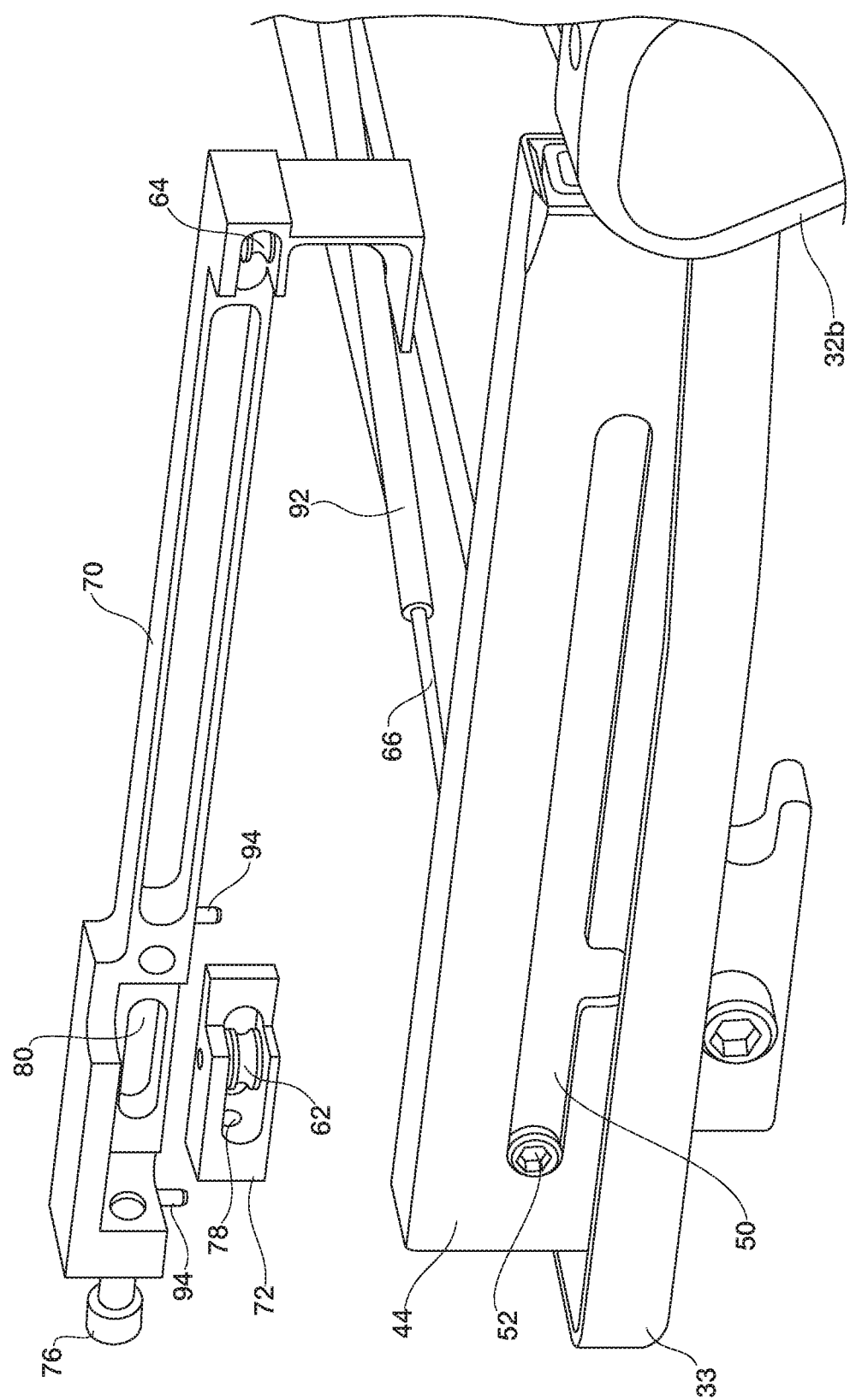
FIG. 14 is an enlarged side perspective view of the seat back food tray assembly shown in FIG. 13.
Figure 15:
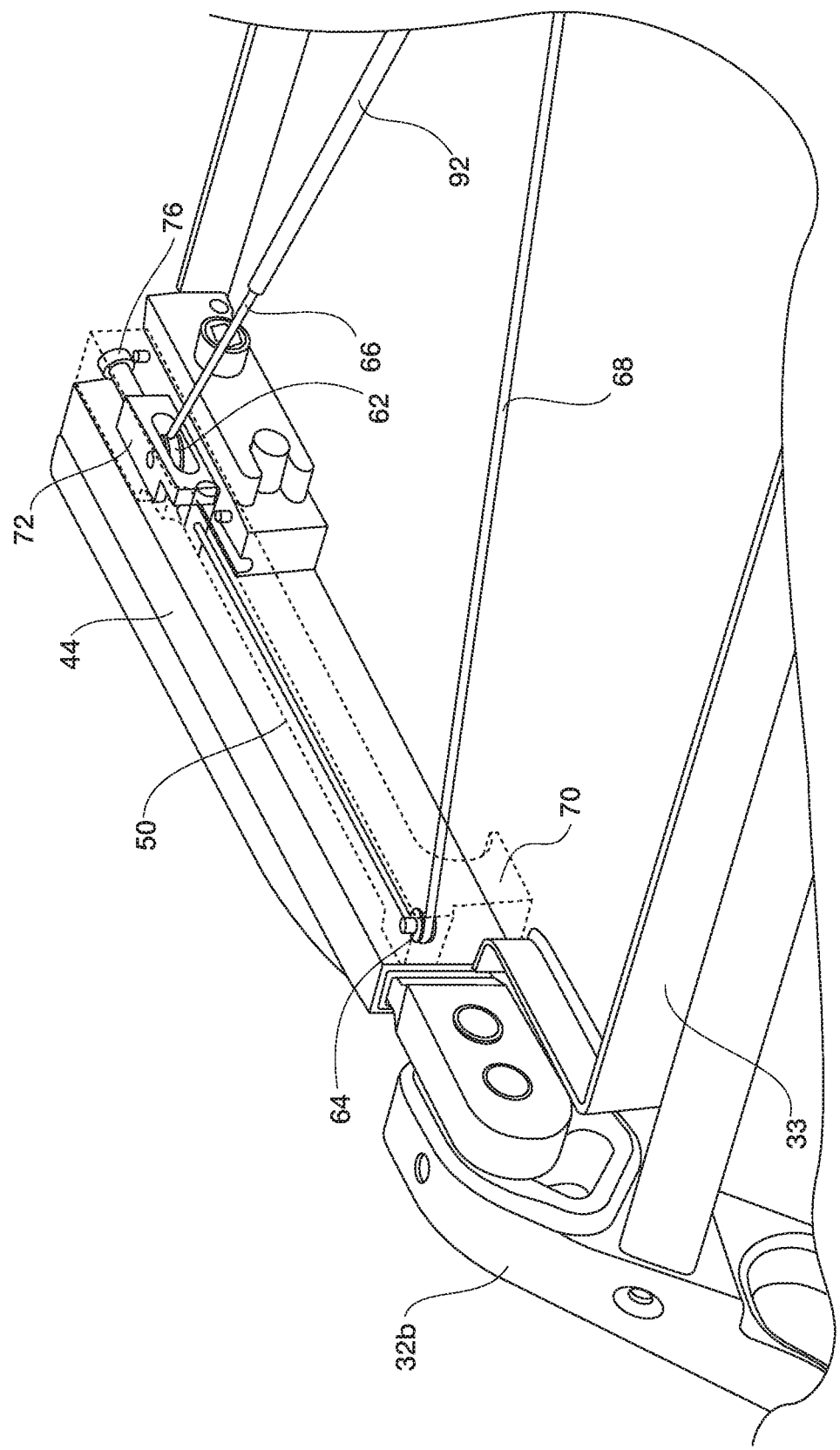
FIG. 15 is an enlarged rear perspective view of the seat back food tray assembly shown in FIG. 13 with the pulley block assembly installed adjacent to the rail and guide assembly.

FIGS. 11-15 illustrate how the pulley assembly 60 shown in FIGS. 9-10 may be installed in combination with a rail and guide assembly 40. FIG. 12 provides an overview of the pulley assembly 60 extending between a pair of rail and guide assemblies adapted to be installed on opposing sides of a tray. The pulley block assembly 70 includes a pair of pins 94 adapted to be inserted into a pair of apertures 96 adjacent to the rail and guide assembly 40. FIGS. 13 and 14 illustrate a rail and guide assembly installed onto a tray 33, with cables 66 and 68 installed onto a pin 52. FIG. 15 show a completed installation of the pulley block assembly 70 mounted adjacent to the guide assembly 44.

In operation, the first and second cables 66, 68 are movable with a first pin 52 and a second pin 52' while a tray 33 slides in either a forward or aft direction. Without an alignment mechanism 60 installed, the rail guide assemblies 40 installed on each side of the tray 33 operate independently and may be prone to jamming if a sufficient amount of force is applied to an individual rail and guide assembly on a single side of the tray. Employing an alignment mechanism 60 prevents jamming by enabling the tray to maintain its horizontal alignment regardless of a leftward or rightward force exerted on the tray 33. Cable(s) are connected to both pins with a constant tension, so that as one pin begins moving along slot 50, the force is transmitted to the other pin through the pulley assembly 60 to enable both pins to move simultaneously.

Figure 16:
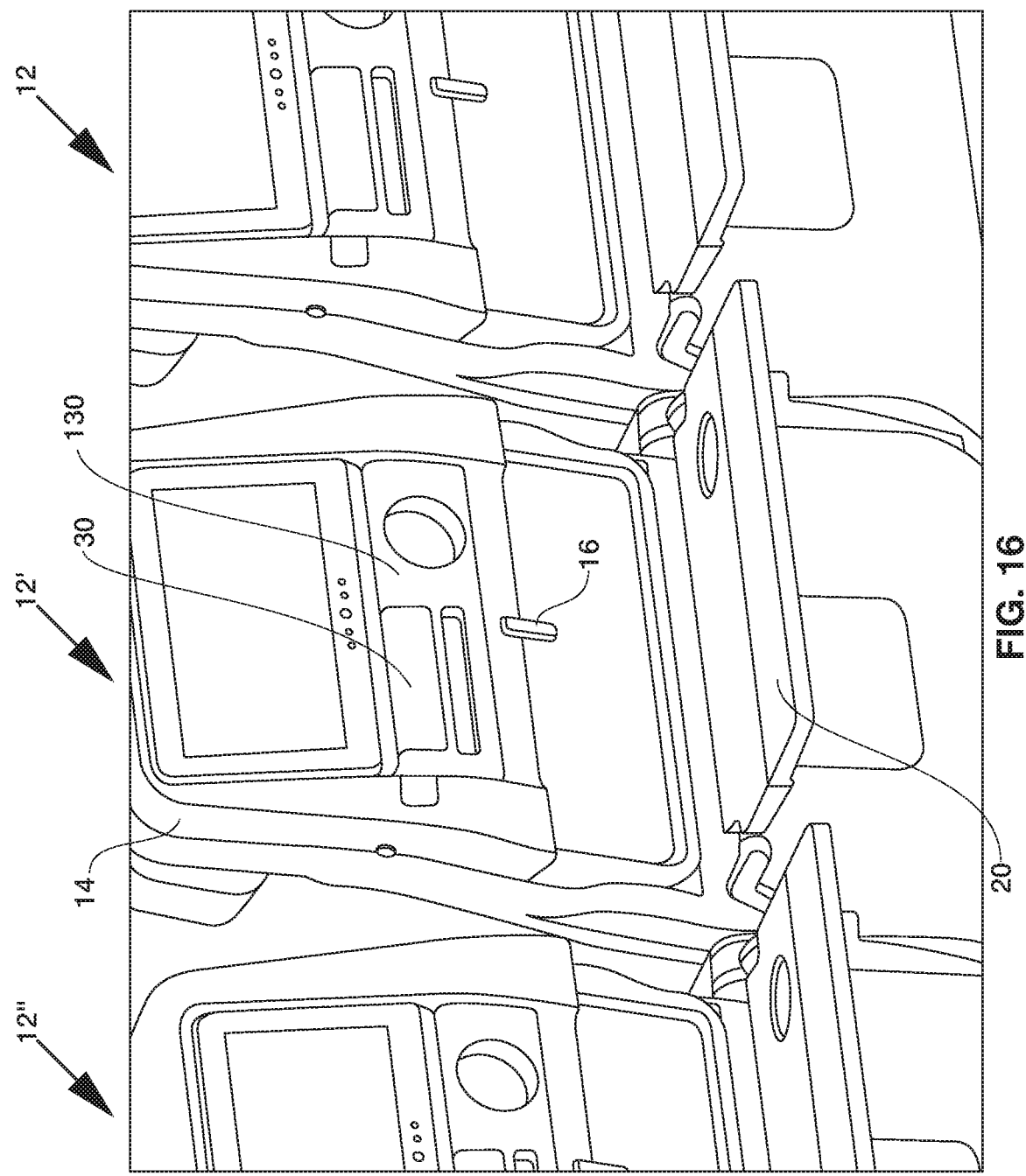
FIG. 16 is an enlarged rear perspective view of a seat system having a seat back food tray and a stowable clamshell holder constructed according to the present inventions.

The alignment mechanism 60 may be adapted for other tray assemblies. For example, FIG. 16 depicts one embodiment of a seat system 10 with a seat back tray assembly 130 installed onto a back of a passenger seat 12 wherein the seat back tray assembly is a stowable clamshell holder adapted to hold a personal electronic device. In the embodiment shown, the stowable clamshell holder 130 is capable of sliding in a forward-and-aft direction.

Figure 17:
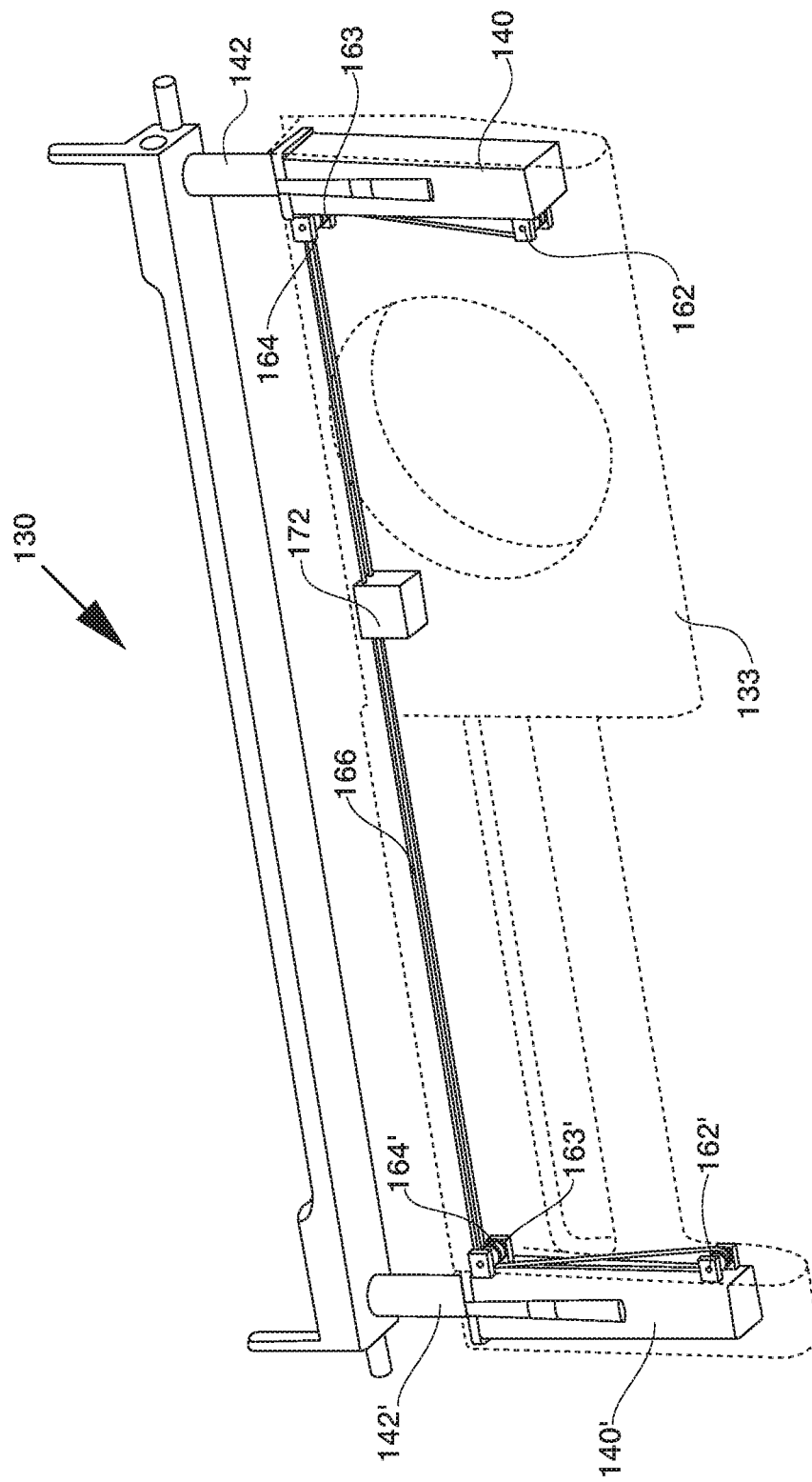
FIG. 17 is a partially transparent top perspective view of a seat back tray assembly having a personal electronic device holder constructed according to another embodiment of the present inventions.
Figure 18:
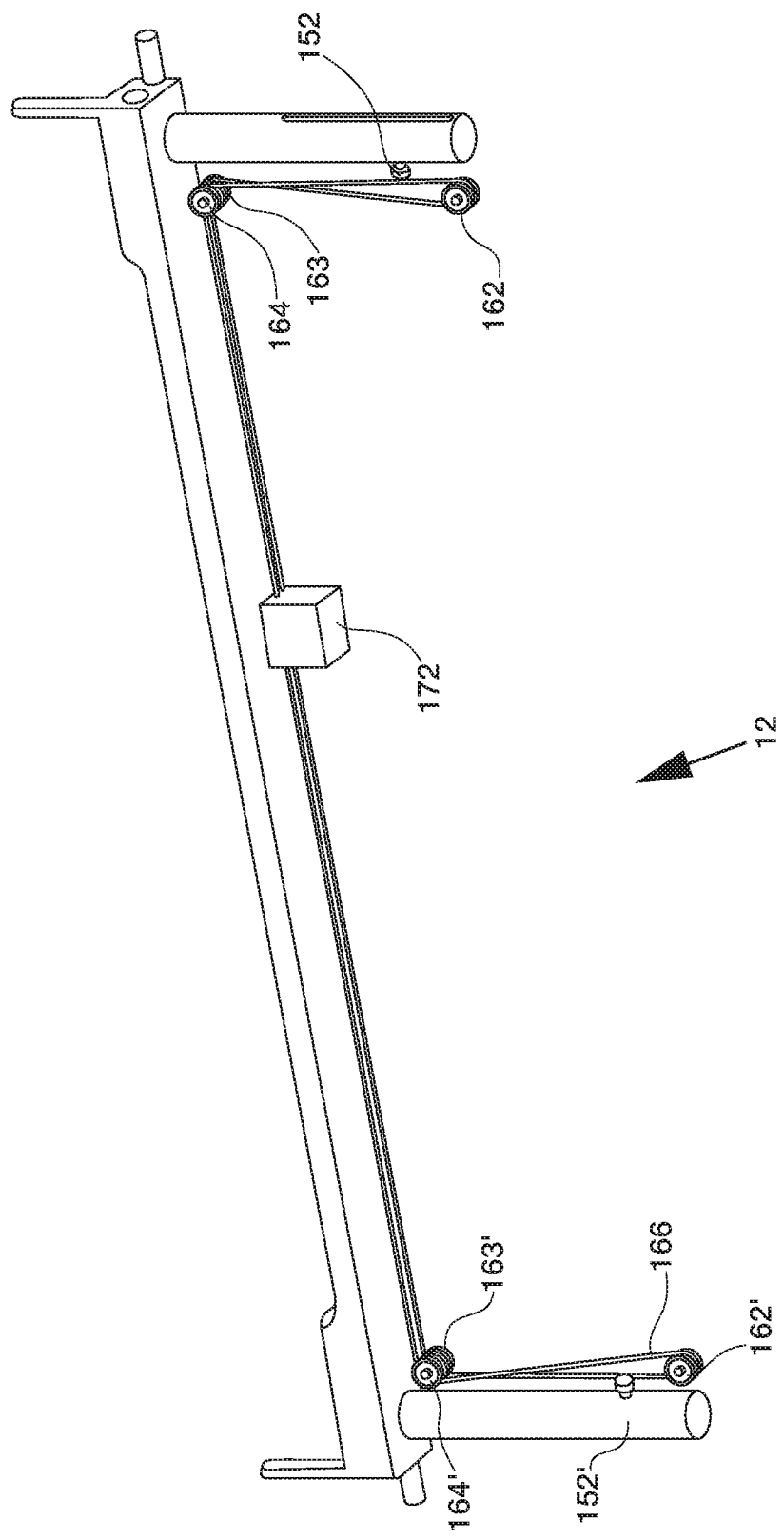
FIG. 18 is a top perspective view of the pulley assembly shown in FIG. 17.

Turning to the embodiment shown in FIGS. 17 and 18, the stowable clamshell holder 130 includes a pulley assembly 160 for use as an alignment mechanism to maintain horizontal alignment during sliding movement in either a forward or aft direction. The tray 133 is adapted to slide using a pair of rail and guide assemblies 140, 140' installed on opposing sides of the tray 133. Each rail and guide assembly includes a series of pulleys 162, 163 and 164. A cable 166 is attached to each pin 152, whereby one end of the cable is connected from a first pulley 162 at the front end and extends rearwardly to the pulley 164 at the rear end of the first rail and guide assembly 140. The cable 166 continues to extend laterally from the pulley 164 at the rear end of the first rail and guide assembly 140 to the pulley 164' at the rear end of the second rail and guide assembly 140. The cable 166 extends forwardly from the pulley 164' to the pulley 162' at the front end of the second rail and guide assembly 140'. The pulley assembly may further include an adjustment assembly 172 for modifying the tension of cable 166.

Certain modifications and improvements will occur to those skilled in the art upon a reading of the foregoing description. By way of example, the pulley assembly shown for the standard and bi-fold food trays may employ a single cable system as shown in the stowable clamshell holder design, and vice versa. Also, the alignment mechanisms disclosed herein may be used with sliding mechanisms other than a rail and guide assembly. Furthermore, the alignment mechanism disclosed herein may comprise a hydraulic mechanism as opposed to the mechanical mechanism depicted here. It should be understood that all such modifications and improvements have been deleted herein for the sake of conciseness and readability but are properly within the scope of the following claims.

I claim:

1. A seat system for a passenger aircraft, said seat system comprising:
    (a) at least one passenger seat; and
    (b) a seat back tray assembly mounted onto the back of said passenger seat and movable between a first storage position and a second deployed position, said food tray assembly including (1) a tray having a sliding mechanism comprising a rail and guide assembly with a first pin attached to one side of said tray and a second pin attached to an opposing side of said tray and adapted for providing movement between a first forward position and a second aft position to a seated passenger and (2) an alignment mechanism attached to said sliding mechanism and comprising a pulley assembly with a first cable and a second cable, and a pair of pulleys with one pulley mounted adjacent to the front end and another pulley mounted adjacent to the rear end of said rail and guide assembly for maintaining said tray in a horizontally aligned relationship during said movement.

2. The seat system according to claim 1 further including a PED holder adapted to hold a personal electronic device.

3. The seat system according to claim 2, wherein said PED holder is attached onto said seat back tray assembly.

4. The seat system according to claim 3, wherein said tray assembly is a stowable clamshell holder installed on the back of said passenger seat.

5. The seat system according to claim 1 further including a lock mechanism attached to the back of said passenger seat for retaining said seat back tray assembly in a secured position.

6. The seat system according to claim 1 further including a display attached to the back of said passenger seat.

7. The seat system according to claim 6, wherein said display is adjoined by a seat back bezel.

8. The seat system according to claim 1, wherein said passenger seat includes a base frame, a seat component attached to said base frame and a backrest attached to said base frame adjoining the seat component.

9. The seat system according to claim 8 further including a head rest.

10. The seat system according to claim 9, wherein said head rest is adjustable to accommodate for the height of the passenger.

11. The seat system according to claim 1 further including an upholstery package.

12. The seat system according to claim 11 further including a trim package.

13. A seat back tray assembly adapted to be mounted onto the back of a passenger seat for a passenger aircraft and movable between a first storage position and a second deployed position, said seat back tray assembly comprising:
    (a) a tray having a first and second attachment arm mounted onto said tray for installing said tray onto the back of a seat system;
    (b) a sliding mechanism installed on said first and second attachment arms adapted for providing movement between a first forward position and a second aft position to a seated passenger parallel to said first and second attachment arms, wherein the sliding mechanism comprises a rail and guide assembly having a first pin attached to one side of said tray and a second pin attached to an opposing side of said tray, and a first slot and a second slot adjacent to each side of said tray with each pin inserted within each slot, whereby said tray slides by sliding said pins along said slots; and
    (c) an alignment mechanism attached to said sliding mechanism for maintaining said tray in a horizontally aligned relationship during said movement, and wherein said alignment mechanism comprises a pulley assembly having: (a) a first cable and a second cable; (b) a first pair of pulleys with one pulley mounted adjacent to the front end and another pulley mounted adjacent to the rear end of said first slot of said rail and guide assembly, and a second pair of pulleys with one pulley mounted adjacent to the front end and another pulley mounted adjacent to the rear end of said second slot of said rail and guide assembly; (c) a first end of said first cable connected to said first pin and said first cable extending rearwardly therefrom over the pulley at the rear end of said first slot, laterally across and over the pulley at the front end of said second slot and connected to said second pin at an opposing end of said first cable; (d) a first end of said second cable connected to said first pin and said second cable extending forwardly therefrom over the pulley at the front end of said first slot, laterally across and rearwardly over the pulley at the rear end of said second slot and connected to said second pin at an opposing end of said second cable; whereby said first and second cables are movable with said first and second pins during sliding movement in the forward-and-aft directions and maintain said horizontal alignment of said first and second pins regardless of a leftward or rightward force exerted on said tray.

14. The seat back tray assembly according to claim 13, wherein said pulley assembly comprises each pair of pulleys mounted within a pulley block assembly installed adjacent to each slot of said rail and guide assembly.

15. The seat back tray assembly according to claim 14, wherein said pulley block assembly further includes a groove and a pulley slider with one of the pulleys mounted within, said pulley slider inserted inside said groove and adapted to slide within said groove to modify a tension of the cable attached to the pulley.

16. The seat back tray assembly according to claim 15, further including an adjustment screw inserted into a threaded aperture on said pulley slider and adapted to adjust the tension of the cable attached to the pulley by tightening or loosening said adjustment screw to slide said pulley slider in a forward-and-aft direction.

17. The seat back tray assembly according to claim 16, wherein said adjustment screw is accessible on an exterior of said tray for adjusting the tension of said cable without disassembling said tray.

18. The seat back tray assembly according to claim 13, wherein said pin is a stop preventing said tray from further moving in a direction.

19. The seat back tray assembly according to claim 13, wherein said cables are concealed within channels inside of said tray.

20. The seat back tray assembly according to claim 19 further including a sheathing to prevent said first and second cables from sliding on one another.

21. The seat back tray assembly according to claim 20, wherein said sheathing is comprised of Polytetrafluoroethylene.

22. The seat back tray assembly according to claim 13, wherein said cables are substantially inelastic.

23. The seat back tray assembly according to claim 22, wherein said cables comprise para-aramid fibers.

24. The seat back tray assembly according to claim 13, wherein said cables are of the same effective length.

25. The seat back tray assembly according to claim 13, wherein said alignment mechanism comprises a pulley assembly having:
(a) a cable;
(b) a first set of pulleys with one pulley mounted adjacent to the front end and another pulley mounted adjacent to the rear end of said first slot of said rail and guide assembly, and a second set of pulleys with one pulley mounted adjacent to the front end and another pulley mounted adjacent to the rear end of said second slot of said rail and guide assembly;
(c) a first end of said cable connected from the pulley at the front end of said first slot to said first pin and extending rearwardly therefrom to the pulley at the rear end of said first slot;
(d) a second end of said cable connected from the pulley at the front end of said second slot to said second pin and extending rearwardly therefrom to the pulley at the rear end of said second slot, wherein said cable extends laterally across from the pulley at the rear end of said first slot to the pulley at the rear end of said second slot;
whereby said cable is movable with said first and second pins during sliding movement in the forward-and-aft directions and maintain said horizontal alignment of said first and second pins regardless of a leftward or rightward force exerted on said tray.

26. The seat back tray assembly according to claim 25, wherein said pulley assembly comprises each pair of pulleys mounted adjacent to each slot of said rail and guide assembly.

27. The seat back tray assembly according to claim 13, wherein said tray is a food tray.

28. The seat back tray assembly according to claim 27, wherein said tray comprises a bi-fold food tray having a first portion and a second portion hingedly connected.

29. A seat system for a passenger aircraft, said seat system comprising:
(a) at least one passenger seat;
(b) a seat back tray assembly mounted onto the back of said passenger seat and movable between a first storage position and a second deployed position, said tray assembly including (i) a tray having a first and second attachment arm mounted onto said tray for installing said tray onto the back of a seat system; (ii) a sliding mechanism installed on said first and second attachment arms and comprising a rail and guide assembly adapted for providing movement between a first forward position and a second aft position to a seated passenger parallel to said first and second attachment arms, and wherein said rail and guide assembly comprise a first pin attached to one side of said tray and a second pin attached to an opposing side of said tray, and a first slot and a second slot adjacent to each side of said tray with each pin inserted within each slot, whereby said tray slides by sliding said pins along said slots; and (iii) an alignment mechanism attached to said sliding mechanism and comprising a pulley assembly for maintaining said tray in a horizontally aligned relationship during said movement; and
(c) a PED holder adapted to hold a personal electronic device.

30. The seat system according to claim 29, wherein said PED holder is attached onto said seat back tray assembly.

31. The seat system according to claim 30, wherein said tray assembly is a stowable clamshell holder installed on the back of said passenger seat.

32. The seat system according to claim 29 further including a lock mechanism attached to the back of said passenger seat for retaining said seat back tray assembly in a secured position.

33. The seat system according to claim 29 further including a display attached to the back of said passenger seat.

34. The seat system according to claim 33, wherein said display is adjoined by a seat back bezel.

35. The seat system according to claim 29, wherein said passenger seat includes a base frame, a seat component attached to said base frame and a backrest attached to said base frame adjoining the seat component.

36. The seat system according to claim 35 further including a head rest.

37. The seat system according to claim 36, wherein said head rest is adjustable to accommodate for the height of the passenger.

38. The seat system according to claim 29 further including an upholstery package.

39. The seat system according to claim 38 further including a trim package.

40. The seat back tray assembly according to claim 29, wherein said pulley assembly having:
(a) a first cable and a second cable;
(b) a first pair of pulleys with one pulley mounted adjacent to the front end and another pulley mounted adjacent to the rear end of said first slot of said rail and guide assembly, and a second pair of pulleys with one pulley mounted adjacent to the front end and another pulley mounted adjacent to the rear end of said second slot of said rail and guide assembly;
(c) a first end of said first cable connected to said first pin and said first cable extending rearwardly therefrom over the pulley at the rear end of said first slot, laterally across and over the pulley at the front end of said second slot and connected to said second pin at an opposing end of said first cable;
(d) a first end of said second cable connected to said first pin and said second cable extending forwardly therefrom over the pulley at the front end of said first slot, laterally across and rearwardly over the pulley at the rear end of said second slot and connected to said second pin at an opposing end of said second cable;
whereby said first and second cables are movable with said first and second pins during sliding movement in the forward-and-aft directions and maintain said horizontal alignment of said first and second pins regardless of a leftward or rightward force exerted on said tray.

41. The seat back tray assembly according to claim 40, wherein said pulley assembly comprises each pair of pulleys mounted within a pulley block assembly installed adjacent to each slot of said rail and guide assembly.

42. The seat back tray assembly according to claim 41, wherein said pulley block assembly further includes a groove and a pulley slider with one of the pulleys mounted within, said pulley slider inserted inside said groove and adapted to slide within said groove to modify a tension of the cable attached to the pulley.

43. The seat back tray assembly according to claim 42 further including an adjustment screw inserted into a threaded aperture on said pulley slider and adapted to adjust the tension of the cable attached to the pulley by tightening or loosening said adjustment screw to slide said pulley slider in a forward-and-aft direction.

44. The seat back tray assembly according to claim 43, wherein said adjustment screw is accessible on an exterior of said tray for adjusting the tension of said cable without disassembling said tray.

45. The seat back tray assembly according to claim 40, wherein said pin is a stop preventing said tray from further moving in a direction.

46. The seat back tray assembly according to claim 40, wherein said cables are concealed within channels inside of said tray.

47. The seat back tray assembly according to claim 46 further including a sheathing to prevent said first and second cables from sliding on one another.

48. The seat back tray assembly according to claim 47, wherein said sheathing is comprised of polytetrafluoroethylene.

49. The seat back tray assembly according to claim 40, wherein said cables are substantially inelastic.

50. The seat back tray assembly according to claim 49, wherein said cables comprise para-aramid fibers.

51. The seat back tray assembly according to claim 40, wherein said cables are of the same effective length.

52. The seat back tray assembly according to claim 29, wherein said alignment mechanism comprises a pulley assembly having:
(a) a cable;
(b) a first set of pulleys with one pulley mounted adjacent to the front end and another pulley mounted adjacent to the rearend of said first slot of said rail and guide assembly, and a second set of pulleys with one pulley mounted adjacent to the front end and another pulley mounted adjacent to the rear end of said second slot of said rail and guide assembly;
(c) a first end of said cable connected from the pulley at the front end of said first slot to said first pin and extending rearwardly therefrom to the pulley at the rear end of said first slot;
(d) a second end of said cable connected from the pulley at the front end of said second slot to said second pin and extending rearwardly therefrom to the pulley at the rear end of said second slot, wherein said cable extends laterally across from the pulley at the rear end of said first slot to the pulley at the rear end of said second slot;
whereby said cable is movable with said first and second pins during sliding movement in the forward-and-aft directions and maintain said horizontal alignment of said first and second pins regardless of a leftward or rightward force exerted on said tray.

53. The seat back tray assembly according to claim 52, wherein said pulley assembly comprises each pair of pulleys mounted adjacent to each slot of said rail and guide assembly.

54. The seat back tray assembly according to claim 29, wherein said tray is a food tray.

55. The seat back tray assembly according to claim 54, wherein said tray comprises a bi-fold food tray having a first portion and a second portion hingedly connected.

* * * * *